Figure 4:
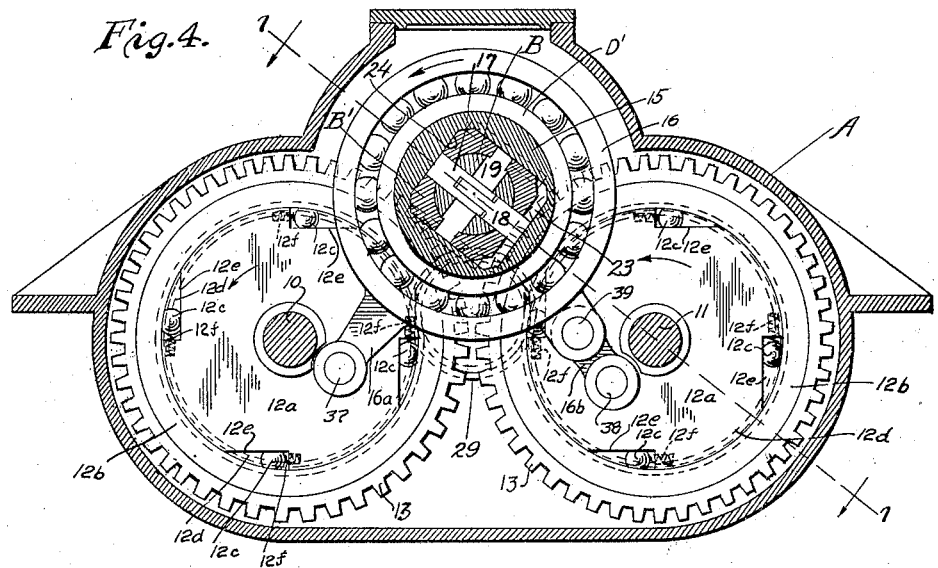

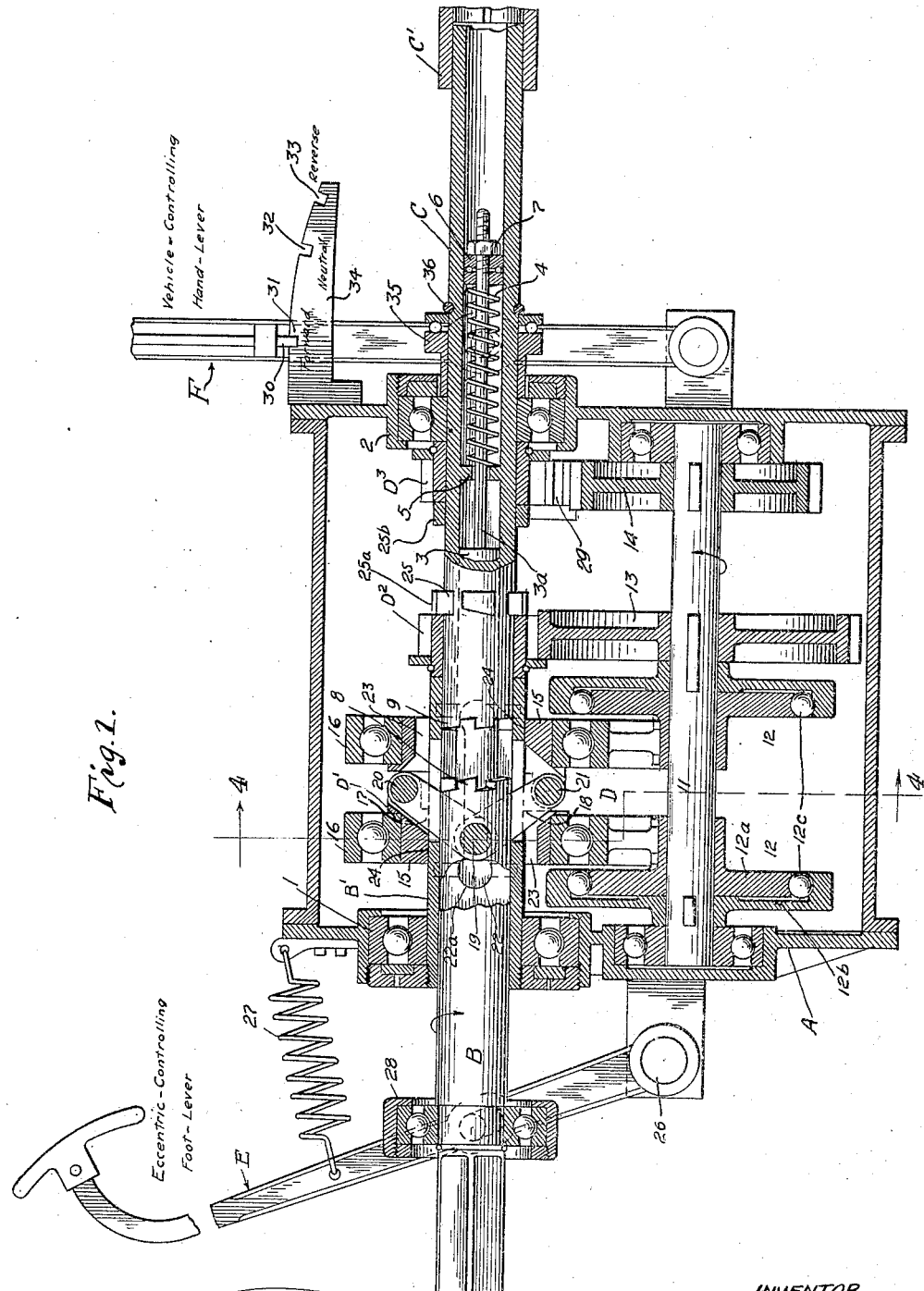

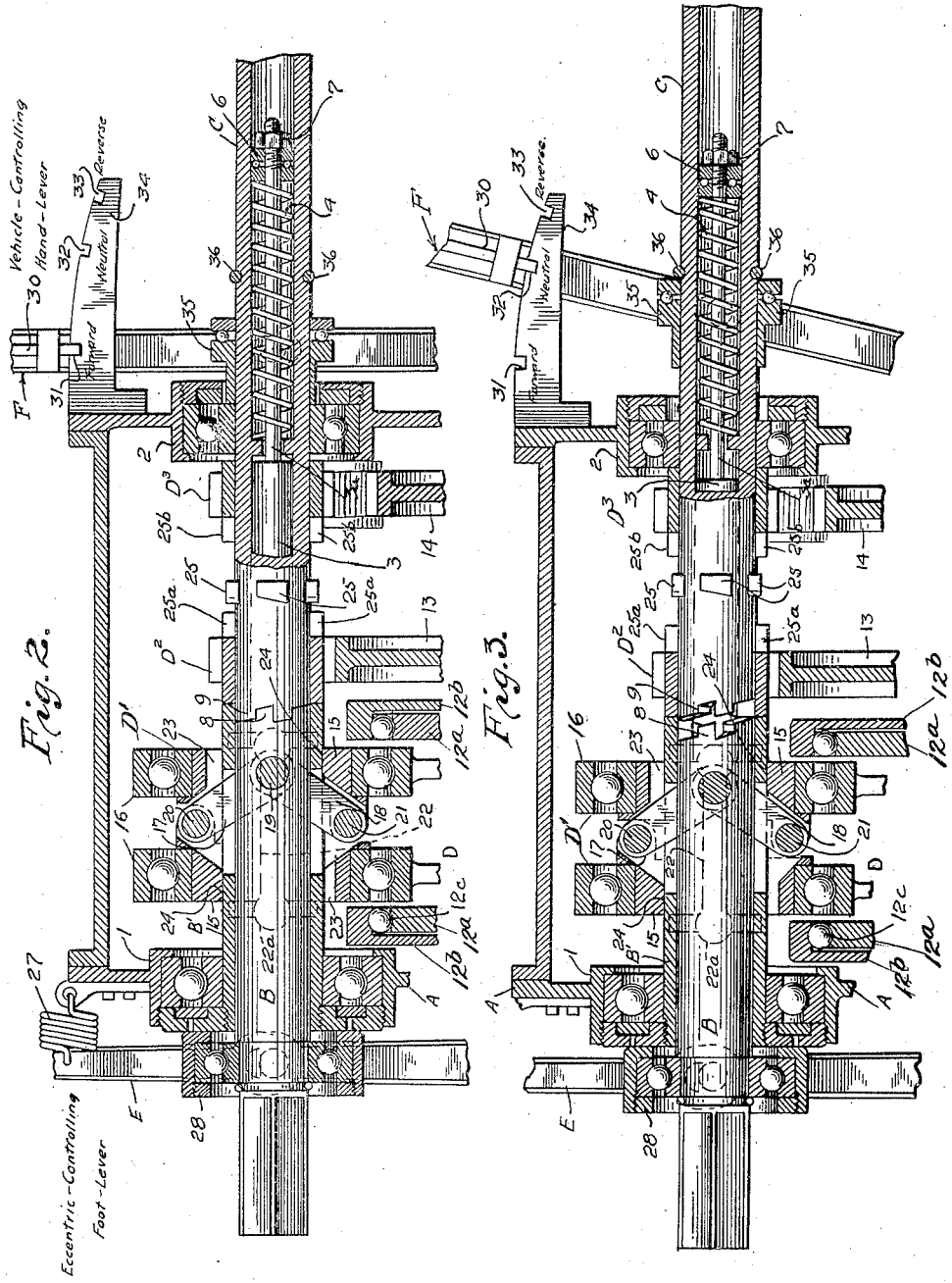

J. DE MARTINO.
POWER TRANSMISSION MECHANISM.
APPLICATION FILED JULY 16, 1918.

1,349,328.

Patented Aug. 10, 1920.
3 SHEETS—SHEET 3.

INVENTOR
Joseph de Martino
BY Dyrenforth, Lee, Chritton & Wiles
ATTORNEYS ced to connect either the forwardly rotating
UNITED STATES PATENT OFFICE.

JOSEPH DE MARTINO, OF CHICAGO, ILLINOIS, ASSIGNOR TO MECHANICAL IMPROVEMENT CO., OF CHICAGO, ILLINOIS, A CORPORATION OF ILLINOIS.

POWER-TRANSMISSION MECHANISM.

1,349,328.   Specification of Letters Patent.   Patented Aug. 10, 1920.

Application filed July 16, 1918. Serial No. 245,186.

*To all whom it may concern:*

Be it known that I, JOSEPH DE MARTINO, a citizen of Italy, (who have taken out first papers for citizenship in the United States,) residing at Chicago, in the county of Cook and State of Illinois, have invented a new and useful Improvement in Power-Transmission Mechanism, of which the following is a specification.

This invention relates particularly to variable speed power transmission mechanism of a type adapted to transmit a gradually variable speed.

The primary object of the invention is to provide easily controlled transmission mechanism of the character indicated, which is of durable construction and reliable in operation.

A further object is to provide variable speed mechanism of the character indicated which is well adapted for use in connection with motor-driven vehicles, such as automobiles, motor trucks, power boats, etc.

The present invention constitutes a modification of the invention described in my copending application, Serial No. 245,185, filed of even date herewith. The preferred embodiment comprises a longitudinally movable driving-shaft equipped with an adjustable eccentric; a driven shaft in alinement with and direct-coupled to the driving-shaft; transmission mechanism, of which the eccentric forms an element, and which includes a pair of countershafts equipped with friction ratchet devices actuated by said eccentric and provided with a forwardly rotating gear and a rearwardly rotating gear journaled on the driven shaft; a clutch member on the driven shaft adapted to connect either the forwardly rotating gear or the reversely rotating gear; a spring-retracted foot-lever serving to adjust the driving-shaft and through the medium thereof the eccentric mounted thereon; and a hand-lever adapted to adjust the driven shaft to a position corresponding with the forward drive, the neutral position, or the reverse drive, at will. In this construction, when the foot-lever is retracted by the spring connections, it causes the shifting of the eccentric from a concentric position to extreme eccentric position and then back to concentric position, effects direct coupling of the driving-shaft to the driven shaft, assuming the hand-lever to be in the forward position, and causes the driven shaft to be disengaged from the forwardly rotating gear of the variable speed transmission mechanism when the direct coupling is effected. In this action, the driven shaft slips through the ring of the hand-lever to permit automatic disengagement of the driven shaft from the variable speed transmission mechanism.

The invention is illustrated, in its preferred embodiment, in the accompanying drawings, in which—

Figure 5:
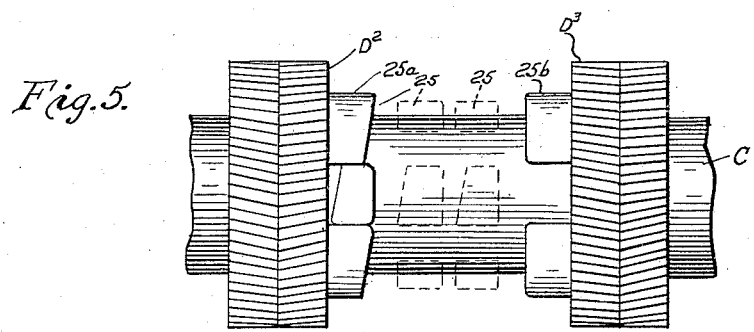
Figure 6:
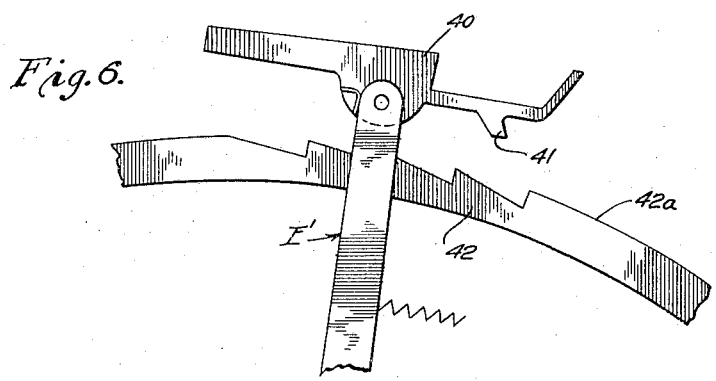

Figure 1 is a longitudinal sectional view of power transmission mechanism embodying the invention, this section being taken as indicated at the line 1 of Fig. 4; Fig. 2, a broken longitudinal section showing the driving and driven shafts in direct-coupled relation, with the driven shaft disengaged from the forward-drive gear of the variable speed transmission mechanism; Fig. 3, a similar view, showing the hand-lever in the neutral position, holding the driven shaft in such position that it can not engage with either the forward or reverse drive; Fig. 4, a transverse vertical sectional view of the mechanism; Fig. 5, a broken elevational view of the driven shaft and the forward and reverse gears journaled thereon; and Fig. 6, a broken elevational view showing a modified form of foot-lever adapted to be set in position to maintain the eccentric devices for any desired length of time in position to cause propulsion of the vehicle through the medium of the variable speed transmission mechanism.

In the construction illustrated, A represents a gear-casing, which may be of any approved construction; B, a driving-shaft shaft extending into one end of the upper portion of the gear-casing and also extending through a longitudinally immovable tubular auxiliary driving shaft B¹, which is in the nature of a stub-shaft journaled in an anti-friction bearing 1 in the end of the gear-casing; C, a longitudinally adjustable tubular driven shaft journaled in the opposite end of the casing in an anti-friction bearing 2; D, variable speed transmission mechanism between the driving-shaft B and the driven shaft C, and including eccentric devices D¹ mounted on the driving-shaft, and a forward-drive gear D² and a rearward-drive gear D³ journaled on the driven shaft; an eccentric-controlling foot-lever E, which controls the position of the eccentrics through the medium of the driving-shaft B and also controls the direct-coupling of the driving-shaft to the driven shaft, as well as the disconnection of the driven shaft from the gear D² when the direct-coupling is effected; and a vehicle-controlling hand-lever F, which is capable of shifting the driven shaft C rearwardly to either the neutral position or the reverse position, but which will also permit slippage of the shaft C through it to enable the driving-shaft to automatically disconnect the driven shaft from the gear D² when the direct coupling is effected.

The driving shaft B may be actuated directly by the motor, and may have telescopic, splined connection with the motor-shaft.

The driven shaft C may have splined connection with a tubular, auxiliary driven shaft C¹, as illustrated in Fig. 1; and the shaft C¹ may drive, through a universal joint, to the differential gear mechanism of the motor vehicle.

The shaft B is provided with a reduced extension 3, which is received in the adjacent end of the tubular shaft C, and the shaft B is provided with a further reduced extension or stem 3ª, which is encircled by a coil-spring 4, confined between an internal shoulder 5 in the shaft C and an anti-friction collar 6 on the stem 3ª, which is adjustable by means of a nut 7. The adjacent extremities of the large portion of the driving-shaft B and the driven shaft C, are provided, respectively, with clutch members 8 and 9, for the purpose of direct-coupling of the driven shaft to the driving-shaft.

The variable speed transmission mechanism D comprises, in addition to the eccentric devices D¹, a pair of countershafts 10 and 11, journaled in the lower portion of the casing on opposite sides of the vertical central plane thereof; ratchet devices 12 mounted on and serving to actuate said countershafts; and forward-drive and reverse-drive gears 13 and 14, respectively, fixedly mounted on the countershafts.

Each eccentric device D¹ comprises an eccentric member 15 mounted for transverse adjustment on the shaft B¹, an eccentric ring 16 having one arm 16ª adapted to actuate the ratchet on one countershaft, and a link 16ᵇ adapted to actuate a ratchet on the other countershaft. The ratchet devices shown are of the friction type. Each comprises an oscillating disk 12ª journaled on the countershaft; a flanged disk 12ᵇ fixedly secured to the countershaft; and rolling grippers 12ᶜ, which may be balls or rollers, confined in recesses 12ᵈ between the periphery of the disk 12ª and the flange of the disk 12ᵇ. The recesses are provided with inclined walls 12ᵉ, adapted to produce a wedging effect between the wall of the recess and the flange of the disk 12. The balls are forced into gripping relation by means of springs 12ᶠ.

The means for effecting transverse adjustment of the eccentrics when the driving shaft is shifted longitudinally preferably comprises a pair of links 17 and 18, whose inner ends are connected, by a pivot 19 to the shaft B, and whose outer ends are connected to the eccentric members 15 by means, respectively, of pins 20 and 21. The links 17 and 18 extend through slots in the shaft B¹ and enter slots in the shaft B. The shaft B¹ is provided, also, with slots 22, which serve as guides for the reduced ends of the pin 19. To facilitate assembly, the slots 22 are provided at their extremities with enlargements 22ª, thus permitting the ready introduction of the pin 19.

The eccentric disks 15 are shown in their concentric position. The shaft B¹ is preferably of square external form; and the eccentric disks 15 are slotted to embrace the shaft. The slots 23 permit adjustment of the eccentrics in opposite directions. In their concentric positions, the eccentric disks have shoulders 24 engaging the shaft B¹, thus limiting both the forward and rearward shifting of the shaft B.

The main clutch members 8 and 9 of the driving and driven shafts are for effecting direct-drive. The driven shaft is equipped with an auxiliary clutch member 25, which is adapted to engage either the clutch member 25ª of the forward-rotation gear D², or the clutch member 25ᵇ of the rearward-rotation gear D³.

The position of the driving-shaft B is controlled by the foot-lever E, which is mounted on a pivot 26 carried by the gear-casing, or other stationary support. The foot-lever is retracted by means of a spring 27, while the spring 4 also tends to draw the driving and driven shafts into direct-coupled relation. The lever E is equipped with a shifting-ring 28, which is longitudinally immovable with relation to the shaft B.

Motion is communicated in a reverse direction from the gear 14 to the gears D³ through the medium of idler 29.

The lever F is equipped with a manually-actuated catch 30, which is adapted to engage any one of the three notches 31, 32 and 33 of a stationary segment 34. Said notches correspond, respectively, with the forward-drive, neutral position, and reverse-drive of the mechanism, and are so marked on the drawing. The vehicle-controlling lever F is equipped with a shifting-ring 35, through which the shaft C can slip. The shaft C is, however, equipped with a shoulder, preferably a split-ring 36, which enables the hand-lever to retract the driven shaft, as in moving it to the neutral or reverse position. On the other hand, the shaft C will slip through the ring 35 when the foot-lever E is permitted to return to the position shown in Fig. 2, assuming the hand-lever to be set in the position shown in the said figure, for forward-drive. In this action, the direct coupling of the driving-shaft to the driven shaft is effected, and the driven shaft is then forced rearwardly by the driving-shaft to disconnect the clutch-member 25 from the clutch-member 25$^a$. Fig. 3 shows the hand-lever set in the neutral position. The reverse connection is established by moving the hand-lever rearwardly still farther to engage the notch 33. In Fig. 5, the full-line position of the auxiliary clutch-member 25 shows it in engagement with the clutch-member 25$^a$ of the forward-drive gear D$^2$. The lefthand dotted position corresponds with the direct-drive, and the righthand dotted position corresponds with the neutral position of the hand-lever.

From the description given, the operation will be readily understood. Assuming the mechanism to be installed in an automobile, for example, if it is desired to propel the vehicle forwardly, the operator presses the foot-lever E forwardly to the position shown in Fig. 1, thus shifting the eccentrics first to extreme eccentricity and then back to concentric position; he then moves the hand-lever from the neutral position to the forward position, thus permitting the spring 4 to move the driven shaft C forwardly until the auxiliary-clutch member 25 engages the clutch-member 25$^a$; the operator then relieves the pressure on the foot-lever, and permits the springs to gradually retract the foot-lever, thus throwing the eccentrics gradually to extreme eccentricity and causing the vehicle to be propelled forwardly at gradually increasing speed through the medium of the gears 13 and D$^2$. When the driven shaft C reaches a speed of rotation approximating the speed of the driving-shaft B, as occurs when the eccentrics are in extreme eccentric position, the operator permits the foot-lever to be shifted quickly to the position shown in Fig. 2, which results in establishing direct-drive through the medium of the main clutches 8 and 9, and also allows the driving-shaft to shift the driven shaft rearwardly and disconnect the auxiliary clutch 25 from the clutch 25$^a$, as shown in Fig. 2. In this action, the driven shaft slips through the ring of the hand-lever, as will be understood from Fig. 2. In the final rearward movement of the driving-shaft, the eccentrics are returned to the concentric position, and the driven shaft is automatically disconnected from the forward-rotating gear D$^2$ of the variable speed transmission mechanism.

By retracting the hand-lever to the position shown in Fig. 3, the main clutch-member 8 is unable to engage the clutch-member 9, and the auxiliary clutch-member 25 is free from engagement with both of the gears D$^2$ and D$^3$. When it is desired to reverse the direction of propulsion, this is accomplished by shifting the hand-lever to the reverse position, thus throwing the auxiliary clutch-member 25 into engagement with the clutch-member 25$^b$ of the gear D$^3$.

The speed of rotation of the driven shaft in a forward direction, when actuated through the medium of the variable speed transmission mechanism, is dependent upon the range of shifting of the eccentrics and the distance of the wrist-pins 37 and 38 of the ratchet devices from the countershafts 10 and 11; also, upon the gear-ratio between the gear 13 and gear D$^2$. In the illustration given, the countershafts are adapted to rotate at slightly less than one-fourth of the speed of the driving-shaft when the eccentrics are at points of extreme eccentricity; and a gear ratio of 4 to 1 is used between the gear 13 and the pinion D$^2$, so that the driven shaft will rotate at a speed approximately that of the driving-shaft, and thus, when the direct-connection is established, no shock upon the mechanism or vehicle results.

It will be noted from Fig. 4 that the arm 16$^a$ is rigid with the eccentric-ring 16, while the link 16$^b$ is connected, by means of a pivot 39 with an ear of the eccentric-ring. Thus each eccentric is adapted to positively actuate a clutch-disk on each countershaft in both directions of oscillation. In the driving-stroke of the clutch-disk, such positive actuation is essential, and it is desirable to have the return stroke of the disk positive, rather than to depend upon a spring for effecting the idle stroke. It will be noted that the two eccentrics of the pair shown shift in opposite directions, so that when one eccentric is performing its working stroke, the other eccentric is performing its idle stroke. It will be understood, also, from Fig. 4, that the lefthand disk 12$^a$ performs its work while the disk is being drawn or swung upwardly by the arm 16$^a$ of the eccentric, while the working stroke of the righthand disk occurs by means of a thrusting action through the link 16$^b$. By reason of the position of the parts, however, the working strokes overlap. The working stroke of the other eccentric is separated by an angle of 180° from that of the eccentric shown in Fig. 4, so that the countershafts receive a series of impulses, and it will be understood that both countershafts are geared back to the driven shaft, that is, to the gears D$^2$ and D$^3$.

The construction described is compact and requires but short longitudinal space. It will be understood that the mechanism may be lengthened, if desired, and the driving-shaft may be equipped with one or more additional pairs of eccentrics set at an angle to the pair shown, and the countershafts may be equipped with additional ratchet devices actuated by said eccentrics, so that the series of impulses imparted to the countershaft may be increased as desired.

It usually will be desirable, for ordinary automobile purposes, to provide means for setting the foot-lever in position to cause the propulsion of the vehicle for a long distance, as in passing over heavy roads. This may be accomplished in a simple manner by employing the modified form of foot-lever $E^1$, shown in Fig. 6. In this case, the foot-lever is equipped with a pivotally-mounted pedal 40, which is equipped with a tooth or catch 41, adapted to engage a toothed sector 42. The sector 42 has a toothed portion corresponding with the range of eccentricity of the eccentrics, so that the foot-lever can be set to hold the eccentrics in such eccentric position as may be desired and cause the vehicle to be propelled for any length of time desired through the medium of the variable speed transmission mechanism. The rear portion of the sector has a plane upper surface $42^a$, so that the sector will not interfere with the quick release of the foot-lever in passing to the direct-coupled position.

The construction described is simple, durable, and provides for getting a vehicle under way without shock or jar. Such mechanism conduces greatly to the life of the automobile, including the engine, tires, etc. The simplicity of the control is an exceedingly desirable feature. In a general way, the movement of the foot-lever corresponds with the movement of the clutch-lever of a sliding gear transmission mechanism, and the movement of the hand-lever corresponds in a general way with the movement of the gear-shifting lever. There is, however, no shifting of gears; and in the forward movement, it is necessary only to set the hand-lever once, which permits the vehicle to be gotten under way by gradually-increasing speed until the direct-drive is established.

The foregoing detailed description has been given for clearness of understanding only, and no unnecessary limitation should be understood therefrom, but the appended claims should be construed as broadly as permissible in view of the prior art.

What I regard as new and desire to secure by Letters Patent is:

1. The combination of a longitudinally shiftable driving-shaft, variable-throw transmission mechanism, said mechanism comprising an eccentric adjustable by and actuated through the medium of said driving-shaft, and a pair of counter-shafts equipped with wheels for effecting rotation thereof and with oscillating members for effecting rotation of said wheels, connections between said eccentric and said oscillating members for positively actuating the oscillating members in both directions, a driven shaft and actuating means therefor actuated by said counter-shafts, and means for regulating the position of said driving-shaft.

2. The combination of a driving-shaft, variable speed transmission mechanism comprising an eccentric mounted on the driving-shaft and a pair of counter-shafts actuated by said eccentric, a longitudinally movable driven shaft provided with means for direct connection with the driving-shaft, and means for actuating the driven shaft in either direction through the medium of said counter-shafts, the actuation of the driven shaft by direct-connection and through the medium of said transmission mechanism being dependent upon the position of the driven shaft.

3. The combination of a longitudinally adjustable driving-shaft, means for regulating the position of said driving-shaft, a driven shaft in alinement with the driving-shaft, said shafts being provided with means for direct-connection, means for setting the driven shaft in predetermined position, said means adapted to permit slippage of the driven shaft therethrough, variable-throw transmission mechanism comprising an eccentric mounted on the driving-shaft and adjustable by and actuated through the medium thereof, a pair of counter-shafts actuated by said eccentric, and direct and reverse gears journaled on the driven shaft and actuated by said counter-shafts, and means for coupling the driven shaft to either one of said gears.

4. The combination of a longitudinally-adjustable driving-shaft, means for regulating the position of said driving-shaft, a driven shaft in alinement with the driving-shaft, said shafts being provided with means for direct-connection, means for setting the driven shaft in predetermined position, said means adapted to permit slippage of the driven shaft therethrough, variable-throw transmission mechanism comprising an eccentric mounted on the driving-shaft and adjustable by and actuated through the medium thereof, a pair of counter-shafts actuated by said eccentric, and direct and reverse gears journaled on the driven shaft and actuated by said counter-shafts, and means for coupling the driven shaft to either one of said gears, said last-named means being disengageable from one of said gears upon the shifting of the driven shaft through the medium of the driving-shaft.

5. The combination of alined driving and driven shafts equipped with direct-clutch connections, a spring tending to hold said shafts in direct-coupled relation, a lever for shifting said driven shaft provided with means for permitting the driven shaft to slip therethrough, a spring-retracted lever adapted to shift said driving-shaft and through the medium thereof to cause a shifting movement of the driven shaft, variable speed transmission mechanism comprising an eccentric mounted on, adjustable by and actuated through the medium of the driving-shaft, and a pair of counter-shafts actuated by said eccentric and direct and reverse gears journaled on the driven shaft, and an auxiliary clutch-device on the driven shaft adapted to connect it with either one of said gears.

6. The combination of a driving-shaft, equipped with an eccentric, foot-controlled means for varying the position of said eccentric, a pair of counter-shafts equipped with wheels for effecting rotation thereof and equipped with oscillating members adapted to actuate said wheels, an eccentric-ring mounted on said eccentric and equipped with a rigid arm having pivotal connection with one of said oscillating members and a link having pivotal connection with another of said oscillating members, and a driven shaft and actuating means therefor actuated by said counter-shafts.

7. The combination of a driving-shaft, equipped with an eccentric, foot-controlled means for varying the position of said eccentric, a pair of counter-shafts equipped with wheels for effecting rotation thereof and equipped with oscillating members adapted to actuate said wheels, an eccentric-ring mounted on said eccentric and equipped with a rigid arm having pivotal connection with one of said oscillating members and a link having pivotal connection with another of said oscillating members, a driven shaft, and means actuated by said counter-shafts and adapted to actuate said driven shaft in either direction.

8. The combination of a driving-shaft, equipped with an eccentric, foot-controlled means for varying the position of said eccentric, a pair of counter-shafts equipped with wheels for effecting rotation thereof and equipped with oscillating members adapted to actuate said wheels, an eccentric-ring mounted on said eccentric and equipped with a rigid arm having pivotal connection with one of said oscillating members and a link having pivotal connection with another of said oscillating members, a driven shaft, means actuated by said counter-shafts and adapted to actuate said driven shaft in either direction, and means for effecting direct-coupled relation between the driving and driven shafts.

9. The combination of a tubular shaft, a pair of oppositely shiftable eccentrics mounted thereon, a longitudinally adjustable shaft extending into said tubular shaft and equipped with means for effecting adjustment of said eccentrics, a pair of counter-shafts equipped with wheels for effecting rotation thereof and equipped, also, with oscillating members adapted to actuate said wheels, an eccentric-ring on each of said eccentrics, each eccentric-ring having a rigid arm pivotally connected with one member of a pair of said oscillating members and having a link pivotally connected with the other member of said pair of oscillating members, and a driven shaft and actuating means therefor actuated by said counter-shafts.

JOSEPH DE MARTINO.